United States Patent [19]

Hansen, III

[11] Patent Number: 4,550,896

[45] Date of Patent: Nov. 5, 1985

[54] VALVE-STRAINER HOUSINGS AND ASSEMBLIES

[76] Inventor: Charles C. Hansen, III, 1410 Brooke Dr., Downers Grove, Ill. 60515

[21] Appl. No.: 596,653

[22] Filed: Apr. 4, 1984

[51] Int. Cl.$^4$ .................. F16K 25/00; B01D 21/24
[52] U.S. Cl. .................................. 251/84; 251/86; 251/88; 251/357; 251/359; 251/363; 251/365; 137/377; 210/431; 210/418
[58] Field of Search ................ 251/84, 86, 88, 214, 251/223, 215, 225, 357, 359, 363, 365; 137/377; 210/418, 419, 420, 429, 430, 431, 432

[56] References Cited

U.S. PATENT DOCUMENTS

| | | | |
|---|---|---|---|
| 1,411,904 | 4/1922 | Bloch | 251/86 |
| 1,657,173 | 1/1928 | Morrison | 210/418 X |
| 2,271,391 | 1/1942 | Drake | 251/88 |
| 2,490,043 | 12/1949 | Funk | 251/88 |
| 2,633,149 | 3/1953 | McKenna | 210/431 |
| 2,718,373 | 9/1955 | Henry | 251/357 |
| 3,265,351 | 8/1966 | Bredtschneider | 251/88 |
| 3,552,714 | 1/1971 | Manville | 251/88 |
| 3,658,291 | 4/1972 | Meges | 251/266 |
| 3,700,208 | 10/1972 | Jones | 251/84 |
| 4,083,377 | 4/1978 | Luckenbill | 137/377 X |
| 4,121,619 | 10/1978 | Pauliukonis | 137/469 |
| 4,164,048 | 8/1979 | Kampfer et al. | 4/292 |
| 4,249,717 | 2/1981 | Thompson | 251/210 |

FOREIGN PATENT DOCUMENTS 475276 11/1937 United Kingdom .............. 137/377

Primary Examiner—Larry Jones

[57] ABSTRACT

An improved valve-strainer body or housing is disclosed wherein a single structure is adapted for use as both a valve housing for globe valves, gate valves, check valves and the like, and also utilized as a casing for a strainer. The housing is sized such that the single housing may be utilized in differing sized pipeline systems from approximately ¼ inch IPS to 1 inch IPS. The invention also discloses superior means of using the valve body casing in connection with not only threaded pipe systems, but also brazed pipe systems and welded pipe systems. Finally, improvements in the valve assembly structure is also disclosed.

10 Claims, 10 Drawing Figures

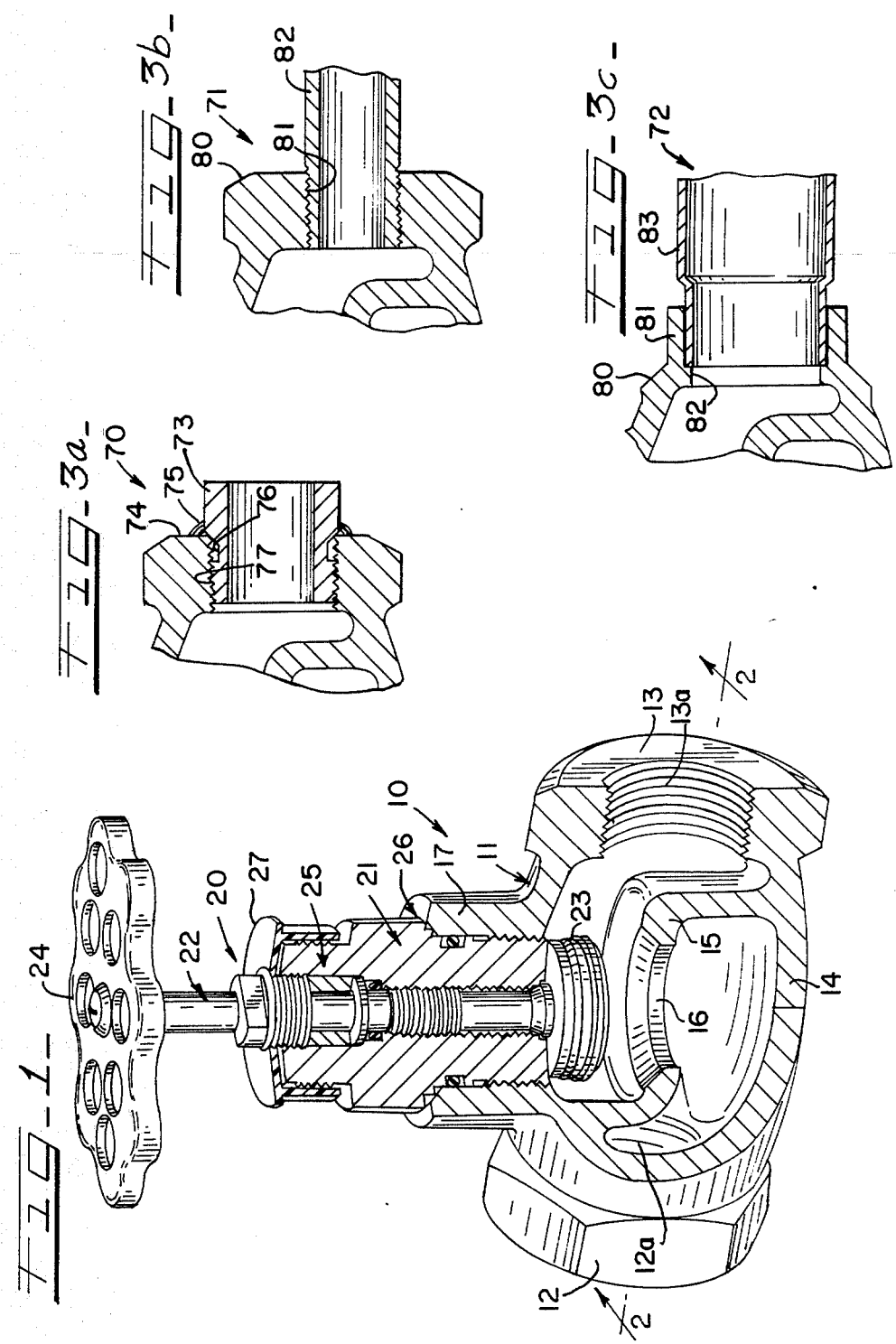

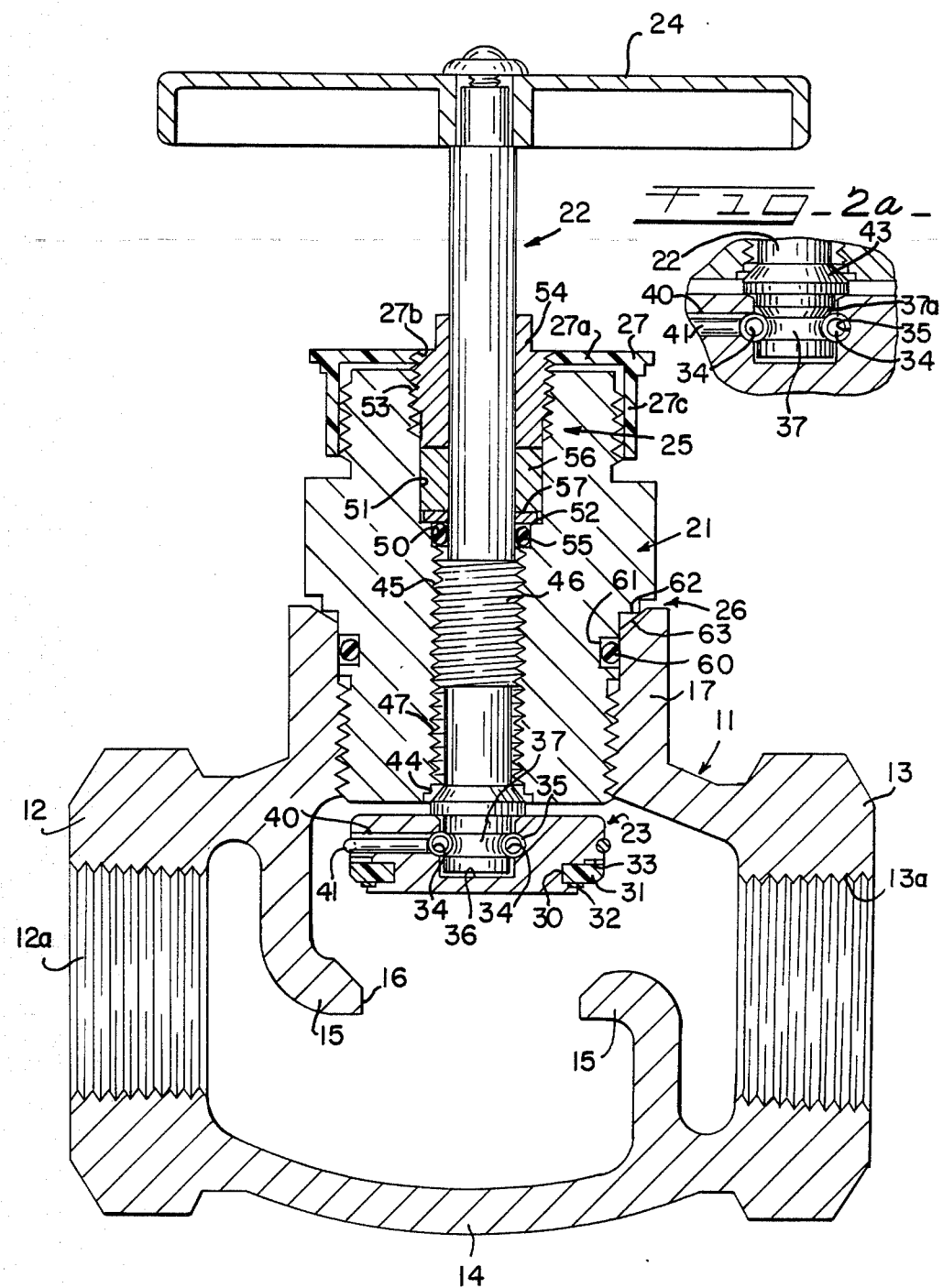

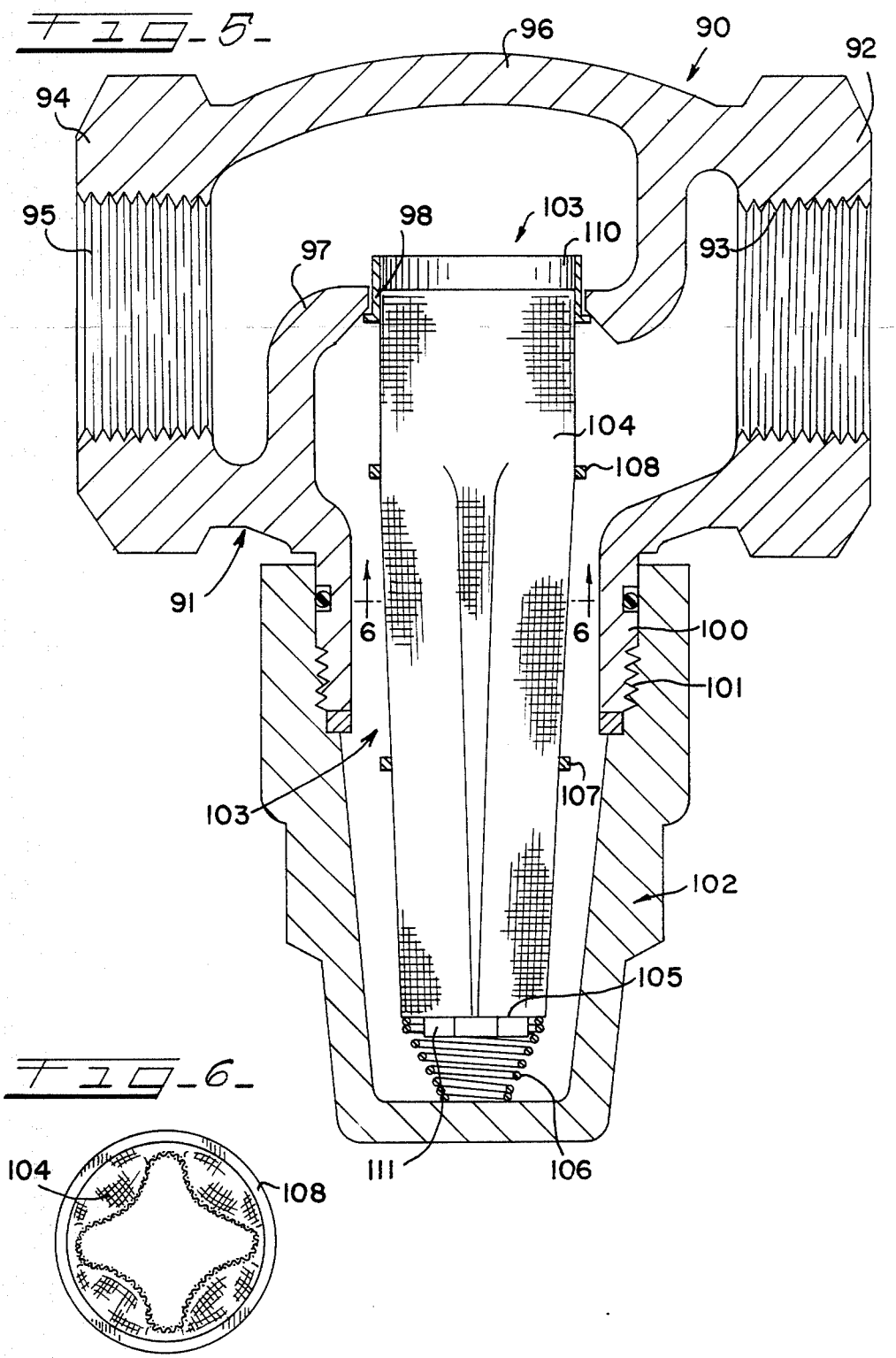

VALVE-STRAINER HOUSINGS AND ASSEMBLIES

BACKGROUND OF THE INVENTION

The invention relates generally to improvements in valve-strainer assemblies and more particularly, to an improved valve-strainer body or casing wherein a single structure is adaptable for use both as a valve housing and a strainer housing in varying sized and varying type pipe systems. Additionally, the invention relates to specific improvements in a valve assembly inserted in the housing, and a strainer which is utilizable in connection with the same housing.

Heretofore known valve assemblies utilizing structures which Applicant has found to be most relevant to the disclosure of the present invention are found in the following U.S. Pat. Nos. 3,552,714 issued to Charles Manville; 3,658,291 issued to H. Meges; 3,700,206 issued to E. Jones; 4,121,619 issued to R. Pauliukonis and 4,249,717 issued to W. Thompson. A heretofore known filter element which Applicant has found as being closest to the strainer element disclosed herein is found in U.S. Pat. No. 4,164,048, issued to J. Kampfer, et al.

While the valve art is a mature one, Applicant has found that the improvements disclosed herein provide better solution foran age-old problem of leakage relating to such valves in use over a period of time, than found in valves of known construction. Additionally, the utilization of the same housing in different types of valves of differing sizes and also in a strainer provides heretofore unknown efficiencies of construction for such devices.

SUMMARY OF THE INVENTION

Invention is directed to valve-strainer assemblies, and to improvements thereof, wherein a valve assembly includes a valve housing, a valve stem mountable for reciprocating movement in the housing, and means for forming a sealing relation between the valve stem and a valve stem bore. The bore and the valve stem include complimentary threaded surfaces along a portion of their lengths, and the bore includes an enlarged cylindrical area outwardly adjacent the threads. Packing material is positioned in at least a portion of that enlarged area, and a packing gland nut is threadedlyreceived at the top of the cylindrical area for applying pressure on the packing material thereunder. An improvement includes a second cylindrical area of lesser diameter than the enlarged cylindrical area and positioned between the complimentary threaded surfaces and the enlarged cylindrical area to define an annular land therebetween which is perpendicular to the valve stem. An annular sealing ring is positioned in the second cylindrical area for providing a sealing engagement between the stem and the bore and a rigid annular washer is mounted on the land for separating the annular sealing ring from the packing material.

The invention is further directed in the valve assembly to a cylindrical valve disc including an annular recess extending radially inwardly adjacent a bottom of the disc for receiving and retaining an annular sealing seat member thereon. The improvement includes the recess being generally rectangular in radial cross section and having a radially extending lip at a bottom end thereof for retaining an annular sealing seat thereon once same is stretched thereover. At least one of the remaining surfaces of the annular recess includes an annular discontinuity of a size sufficient to create a sealing engagement by deforming an adjacent surface of the annular sealing seat which is contiguous therewith.

Additionally, the invention is directed in the valve assembly to improvements in the mounting between a generally cylindrical valve disc and a valve stem or rod having a generally cylindrical body end. The valve disc includes a valve stem receiving bore therein of a diameter larger than a diameter of the stem bottom end for fitting therein. The valve disc includes a stem receiving bore and a first annular groove in the stem receiving bore and the second annular groove adjacent to the bottom end of the valve stem, with both grooves positioned for combined formation of a hollow annular passageway when the valve stem is positioned in the valve receiving bore. A plurality of spherical members are sized to fit in the combined passageway and retain the stem in the bore. Access bore means on the valve disc between an outside surface thereof and the combined passageway providing ingress and egress of the spherical members to the hollow annular passageway. An annular zone of shallow relief relative the second annular groove and positioned immediately inwardly there adjacent on the valve stem provides an area into which metal deformation of the valve stem may occur without forming an interference fit between the valve stem and the stem bore.

The invention is further directed in the assembly to a housing having an inlet passageway, an outlet passageway, and a central body portion therebetween. The central body portion is bifurcated by a curved dividing wall having a central aperture therethrough, The central body portion further includes an annular flange extending from an external portion of same wherein the annular flange is coaxial with the aperature through the dividing wall. An improvement resides in the housing being adaptable for use both as a globe, check, or other valve housing, and also as a strainer housing by the addition of a cover means which is threadedly retained on the annular flange, and a generally cylindrical strainer assembly which is received at one end in said dividing aperature and biased thereagainst by biasing means on the bottom of the strainer which contact the inner end of the cover.

The invention is further directed to an improved strainer or filter element including a generally cylindrical foraminous body, an annular top framework adapted for being retained on the dividing wall circular aperature, and a biasing spring between the bottom of the filter element and the closure cover. The filter element includes an annular opening engaging the annular top framework, and a closed body and including a plurality of doublefolded adjacent sidewall pleats, each joined along a double-folded end and all joined together centrally of the end of the element to define radially extending pleats.

The invention is further directed to a cover made of resilient material which is adapted for fitting over the valve stem and covering the top exposed portion of a valve stem housing to protect external threads on the housing, and to provide a thermo barrier to prevent frost buildup on those threads during use of the valve in a refrigerant system.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, wherein like reference numerals identify like elements throughout and in which:

FIG. 1 is a perspective view, with portions cut away, of a valve assembly constructed in accordance with the present invention;

FIG. 2 is an enlarged cross-section view taken substantially along line 2—2 of FIG. 1;

FIG. 2(a) is an enlarged detail cross-section view showing the valve disc as it appears when retained on the valve stem;

FIG. 3(a) is a detail fragmentary cross-section view of a modification of one end of a valve housing which is substantially similar to the housing shown in FIG. 1 wherein a modified pipe sleeve has been welded onto the end of the housing;

FIG. 3(b) is a detail fragmentary cross-section view similar to FIG. 3(a) of a second modification of the housing wherein the housing has been modified to accept a threaded ips pipe of a diameter smaller than the threaded fitting shown in FIG. 1;

FIG. 3(c) is a detail fragmentary cross-section view similar to FIG. 3(a) of a third modification of the housing structure to accept a thin wall copper tubing used in brazed tube systems;

FIG. 5 is an enlarged cross-section view taken substantially along line 5—5 of FIG. 4;

FIG. 6 is a detail cross-section view of the strainer element shown in FIG. 5 taken substantially along line 6—6 thereof;

DETAILED DESCRIPTION OF THE PREFERRED EMBODIMENTS OF THE INVENTION

Figure 4:
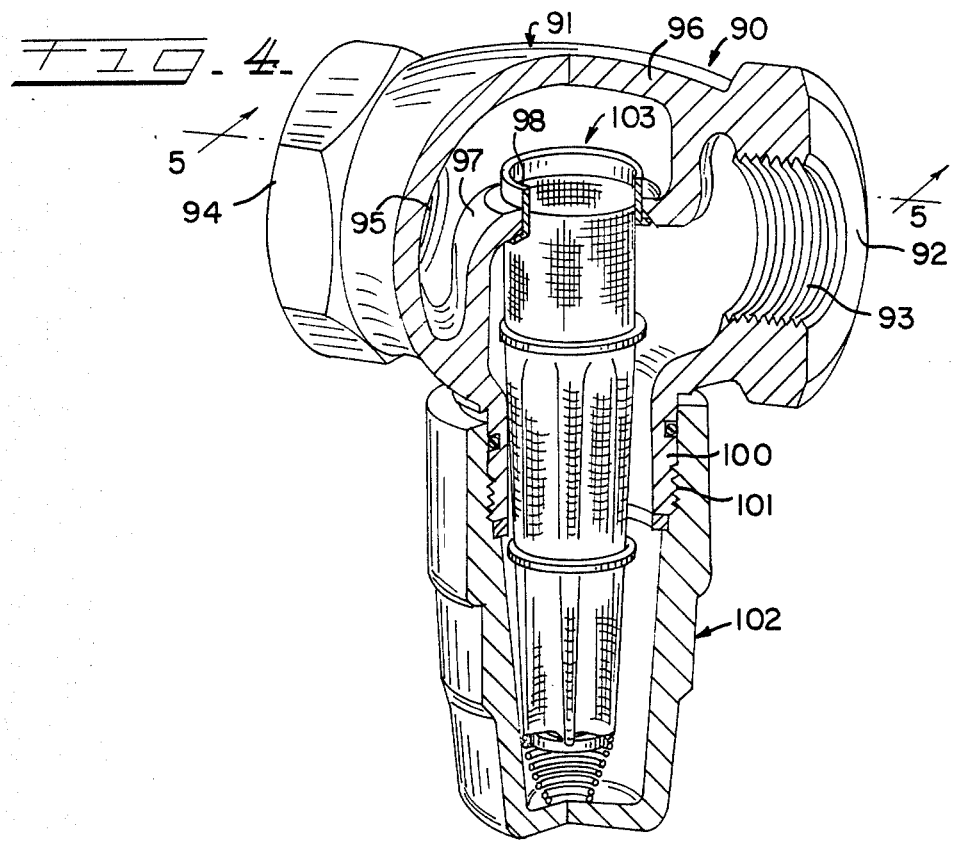
FIG. 4 is a perspective view with portions cut away showing the valve housing of the present invention adapted for use as a strainer body constructed in accordance with the present invention.

Referring to FIG. 1, a first embodiment of the present invention is found in a globe valve 10, constructed in accordance with the present invention, which includes a valve body housing 11, consisting of inlet and outlet passageway flanges 12, 13, respectively, with each flange having a threaded passageway 12a, 13a, respectively, therethrough, a central chamber 14 which is bifurcated by a curved dividing wall 15 having a vertically axially disposed aperture-valve seat 16 therethrough, and a generally cylindrical annular flange 17 which is axially aligned with the valve seat aperture 16. In this embodiment, an annular valve stem housing assembly 20 is mounted mainly inside the annular flange 17 and includes an annular stem housing 21, a valve stem 22 which is threadedly mounted in the housing 21, and a valve disc assembly 23 which is loosely retained in a self-centering manner on the inward end of valve stem 22 so as to sealingly engage the valve seat 16 when the stem is threaded fully into the housing 21. Additionally, valve stem assembly 20 includes means for manual use opening and closing of the valve, in this embodiment, a handwheel 24 which is releasably retained on the outer distal end of valve stem 22. A valve packing assembly, generally indicated at 25, prevents the escape of fluids from between the valve stem and valve stem housing in a superior manner. A sealing means, generally indicated at 26, is positioned between the valve stem housing 21 and the annular housing flange 17 of the valve body 11 to prevent fluid escape through that juncture. Finally, a thermal barrier and thread cover 27 is utilized both to protect the exposed outer threads on stem housing 21 and to provide a barrier which prevents frost buildup on the threads when the valve is used in a refrigerant system. It should be noted that in some valves, this annular flange serves the same function by itself as the flange and valve stem housing perform in the arrangement shown.

Referring to FIGS. 2 and 2(a), the improvements of Applicant's invention in connection with the valve stem assembly and valve stem housing are shown in greater detail. Starting with the bottom of the valve stem assembly, the valve disc 23 is circular in outline and includes an annular recess 30 adjacent to the bottom end thereof into which an annular valve seat sealing member 31, in this embodiment preferably made of polytetrafluroethylene or lead, is retained by being stretched over the distal edge or lip of the recess and retained thereover by a coiled retaining clip 32. The sealing member 31 has a frusto-conical face which is adapted for matingly sealingly engaging a similar frusto-conical face on the valve seat 16 positioned through dividing wall 15 in the central chamber of the valve body housing 11. While the soft material of valve sealing member 31 is adapted to provide a sealing engagement with the valve seat 16, in one aspect of the invention additional potential leakage around the backside of the sealing member 31 is prevented by means of a secondary recess 33, in this embodiment approximately 1/64 inch in height, is cut from the upper wall of recess 30 and provides an annular deformation in this form of a right angled edge between recesses 30 and 33 into which the sealing member creeps or is deformed.

In another aspect of the present invention, the self-centering mounting of the disc 23 on the lower end of the valve stem 23 is accomplished by a plurality of ball bearings 34–34 which are rollably fitted into an annular race defined by a first annular groove 35 on the interior of cylindrical recess 36 of disc 23 which is positioned to align with a second annular groove 37 adjacent the distal end of valve stem 22. When the disc is positioned on the distal end of the valve stem 22, the ball bearins 34–34 may be fitted into an access bore 40 in the disc and the balls are dropped into the combined race 35–37. A coiled retainer 41 fits in an external groove 42 of disc 23 and has a fingerlike projection which extends into the bore 40 to prevent escape of the ball bearings 34–34 unless removal is desired. Liberal tolerances between the ball bearings 34, annular race portions 35–37, and the distal end of the valve stem 22 and recess 36 provide for relative movement between the valve stem and the disc within limits thus allowing automatic centering of the valve disc when it is positioned on the valve seat 16. As shown most clearly in FIG. 2(a), in one aspect of the present invention the upper edge of the grooved race portion 37 in valve stem 22 is relieved as shown at 37(a) in FIG. 2(a) so that any force on the upper edge of groove 37 caused by repeated closing of the valve does not deform that upper edge outwardly to cause interference with recess 36 and hinder removal of the valve disc from the valve stem.

Moving up of the valve stem 22, a raised flange 42 acts as a stop to align the valve disc onto the valve stem for inserting ball bearings 34-34 therein, and the opposing side of the flange 42 includes a frusto-conical wall section 43 which, when the stem is in the uppermost position, engages an annular right angle shoulder 44, at the base of stem bore 45 in stem housing 21. Engagement of frusto-conical surface 43 with shoulder 44 provides an annular line type seal between the valve 22 and the valve stem housing 21 when the stem is fully retracted position (the valve is fully open).

Moving up the valve stem 22 again, a threaded portion 46 of valve stem 22 threadedly engages the mating thread 47 in the stem bore 45, thus moving the valve disc 23 in and out of engagement with the valVe seat 16 in a precise fluid-flow controlling manner. Above the threaded portion 46, the remainder of valve stem 22, except for the handwheel mounting end, is a smooth round cylindrical structure or rod which is adapted to sealingly engage the packing assembly 25 mounted in a widened portion of the stem housing bore 45. The bottommost portion of the widened packing segment of the housing stem bore 45 includes an annular O-ring holding recess 50 positioned immediately above threads 47. Above recess 50 is a larger diameter packing retaining recess 51 with the juncture therebetween defining an annular landing 52. From the top of annular packing recess 51 to the outside of the housing stem bore is a threaded portion 53 which is adapted for threadedly receiving a packing gland nut 54 therein.

Another important aspect of the present invention resides in the dual series sealing structure positioned between the stem threads 46 and the packing nut 54. Immediately adjacent the threaded portion 46 in the O-ring recess 50, is positioned an O-ring 55 which is adapted for sealing surface contact between the valve stem 22 and the valve stem housing 21. Additionally, an annular valve packing 56 is positioned around valve stem 22 between the packing gland nut 54 and a rigid washer 57 which is retained on land flange 52 in order to separate the O-ring 55 from the packing 56 and maintain the packing in an orderly shape. In the present embodiment of the invention, packing gland nut 54 is not substantially tightened when the refrigerant valve is newly placed in service. The O-ring 55 provides the primary sealing means between the valve stem 22 and the valve stem housing 21. As the valve stem is used or maintained in service for longer periods of time, should some leakage eventually occur around O-ring 55, the packing gland nut 54 may then be tightened such that the packing 56 provides an additional sealing capability between the valve stem 22 and the stem housing 21. Further, the provision of graphite lubricant in packing 56 acts to lubricate and strengthen the seal between the O-ring 55, stem 22, and housing 21 whenever the valve stem 22 is moved downwardly axially in stem bore 45.

As shown most clearly in FIG. 2, a thermal cover 27, (in this embodiment preferably made of plastic material) includes an upper flange portion 27a having an aperture 27b centrally therein which is adapted to engage the outer threads of packing gland nut 54 and an annular cylindrical flange 27c extending downwardly from the periphery of upper flange portion 27a engages an upper threaded portion of the valve stem housing 21. This plastic cover 27 protects the stem housing threads from abuse, both when the valve is in storage or being shipped, and also when the valve is in service, and provides a cover for those threads to prevent frost or other moisture buildup thereon which may lead to rust and other deleterious effects on those threads.

In order to effectively seal the annular juncture between the valve stem housing 21 and the annular flange 17 in the valve body, another O-ring 60 is positioned in an annular groove 61 on the outside of valve stem housing 21 such that sealing engagement of the O-ring between the inside of the annular flange 17 and the outside of the valve stem housing 21 is accomplished when the housing is threadedly inserted in the flange. Additionally, an annular line sealing engagement is accomplished between an annular right angle shoulder 62 on the outside of the valve stem housing 21 and a frusto-conical annular surface 63 adjacent the distal end of flange 17 similar to the sealing engagement between valve stem frusto-conical surface 43 and right angle shoulder 44 discussed previously.

Referring to FIGS. 3(a), 3(b) and 3(c), modifications of the outlet passageway of a valve housing similar to housing 11 in the first embodiment are shown generally at 70, 71 and 72, respectively. Valve housing outlet passageway 70 has been modified by the rotating insertion of a threaded tubular member 73 which has been welded at the juncture of the outlet flange face 74 and tube 73 by annular weld 75. The tubular segment 73 incorporates one aspect of the present invention by having formed thereon a relief area 76 between the tubular member threads 77 and the remainder of the tube. This relief area eliminates the existence of threads axially outwardly of face 74, provides a uniform juncture between tube 73 and face 74, and allows the contact structure adjacent welding bead 75 to be substantially uniform in cross-section thus providing a better seal between the tube 73 and face 74. When threads stick out axially beyond face 74, the welding bead may tend to blow away some of the metal in the threads or create other discontinuities which hinder obtaining a complete sealing weld between the face 74 and tube 73. Such construction is utilized when welded steel or other tube construction is found in a refrigeration system in which the valve is positioned. In a preferred embodiment, flange face 74 and the outside of tube 73 wherein bead 75 will be positioned are machine faced to provide greater uniformity in their structure. Referring to FIG. 3(b), the valve body housing 80 is shown with a threaded exit passageway 81 therethrough which is smaller in diameter than the threaded exit passageway 13a shown in FIG. 1, so as to allow a smaller diameter threaded pipe 82 to be matingly engaged therein. As can be seen by FIG. 3(b)the valve body housing of the present invention may be modified such that one size casting may be utilized for several differing pipe-size installations.

In FIG. 3(c), a third modification 72 the valve passageway includes a housing 80 having a large diameter machined cylindrical flange 81 including an internal annular stop portion 82 which is formed therein as a stop for a copper tube 83 which is matingly engageable therein for brazing thereto. The machining of annular flange 81 and stop 82 onto the same base casting as is found in valve body 11 provides an additional use for the same casting and thus cuts manufacturing costs for differing type valve body housings, all within the scope of the present invention.

Thus, the valve housing aspect of the present invention has been shown as utilized in a globe-type valve, which is one of its many adaptational uses. Hereinafter, the valve body housings shown are substantially similar to housing 11, although the finish structure shape (machining) may differ for varying applications thereof. However, the adaptational aspect of the housing in the present invention is easily recognized when viewing the drawings disclosed and described hereafter.

Referring to FIGS. 4, 5 and 6, and in-line type strainer, generally indicated at 90, includes a housing 91 having an inlet side 92 with an inlet passageway 93 therethrough; an outlet side 94 with an outlet passageway 95 therethrough; and a central portion 96 therebetween which is bifurcated by a curved dividing wall 97 having a central aperture 98 therethrough. An annular generally cylindrical flange 100 extends from the central body portion 96 in a direction co-axial with the axis of aperture 98. The outside of annular flange 100 is threaded at 101 for matingly receiving an elongate cap 102 thereover. In one aspect of the present invention a strainer or filter element 103 is positioned with its outlet end through aperture 98 and is retained against movement at the opposite end of the strainer by cap 102.

Filter element 103, which is constructed in accordance with the present invention, is preferably made of stainless steel, bronze, or plastic screen material which is bent to form a hollow generally cylindrical foraminous body 104 at its top end while being deformed inwardly at a plurality of positions (in this embodiment 4 positions at 90° intervals) along a substantial portion of its length to form a generally cross-shape section structure when viewed as shown most clearly in FIG. 6. At the bottom of strainer body 104, the severity of the deformations increase to the point where the screen side segments lose all internal spacial dimension as adjacent contiguous side segments are pinched or pleated together at bottom end 105. A coil spring 106 is affixed to the bottom end 105 of strainer element 103 to contact the bottom of cover 102 and bias the filter element against the dividing wall aperture 98. At spaced positions along the length of filter element 103, annular strengthening ribs 107, 108 and upper annular mounting member 110 strengthen the filter element and maintain same in mounted position. In the preferred embodiment, a permanent magnet 111 is positioned within the coil spring 106 to attract any loose metallic particles in the inlet portion of the strainer.

The strainer structure shown most clearly in cross-section FIG. 6 provides additional space between the outside surface of the strainer 103 and the inner surface of the annular flange 100 and cap 102. This additional space tends not only to equalize the flow space inside and outside the filter, but also increases the amount of space which may be utilized for deposition of particulate matter which cannot flow through the foraminous filter body 104. As such, the filter element 103, constructed in accordance with the present invention, provides a superior construction over heretofore known filter elements, while the strainer housing 91 shows its adaptability between its uses as a globe valve housing and as a strainer housing.

Figure 7:
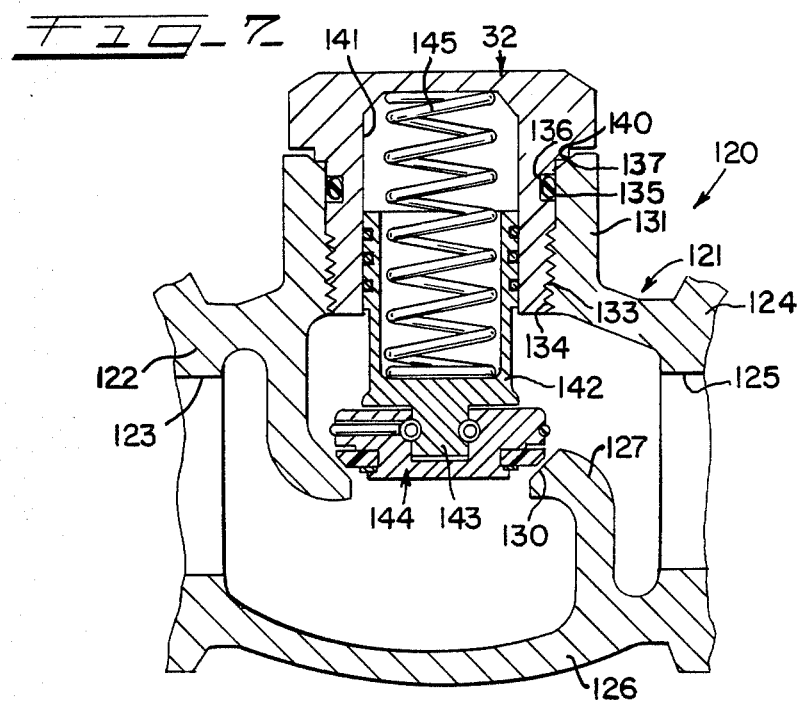
FIG. 7 is a fragmentary cross-section view of a modification of the valve housing similar to that shown in FIG. 2, wherein the valve housing has received a check valve assembly therein which is constructed in accordance with the present invention.

Referring to FIG. 7, an additional modification of the present invention is shown as a check valve assembly 120 which utilizes the same housing 121 as shown at 11 in FIGS. 1 and 2. Housing 121 includes an inlet flange 122 having an inlet passageway 123 therethrough, an outlet flange 124 having an outlet passageway 125 therethrough, and a central portion 126 having a curved dividing wall 127 with an annular valve seat aperture 130 positioned therethrough, similarly as is shown in globe valve housing 11 in FIG. 2. Likewise, check valve housing 121 includes an annular flange 131 extending axially from the central body portion 126 coaxially with the valve seat 130 in dividing wall 127. A check valve mounting 132 is retained on the annular flange 131 by mating threaded portions 133, 134 and is sealed therewith by means of an O-ring 135 mounted in an annular groove 136 in mounting 132.

Similarly to the valve stem mounting housing 21 shown as in FIG. 2, an additional annular line sealing engagement is formed upwardly and outwardly of O-ring 135 by means of a frusto-conical surface 137 adjacent the outward distal end of flange 131 which sealingly engages an annular right angle shoulder 140 formed on the outer portion of check valve mounting 132 in a manner similar to that shown at sealing shoulder 62 and surface 63 in the first embodiment in FIG. 2. A central cylindrical recess 141 in mounting 132 provides a guide for axial reciprocal movement of a check-valve pistion 142 therein. At the bottom distal end 143 of piston 142, a valve disc 144, which is identical to valve disc 23 in the first embodiment, is mounted in a manner identical to that shown in FIG. 2. Piston 142 and disc 144 attached thereto are biased against valve seat 130 by means of a coil spring 145 mounted between the piston 142 and check valve mounting 132. The pressure at which check valVe 120 opens is dependent upon the spring rate of spring 145.

Thus, the various aspects of the present invention have been shown to provide a multitude of structures which are interchangeable between globe valves, check valves, and strainers, all within the scope of the present invention. The structural advantages of the invention which are unrelated to the valve disc assembly 23 are also adaptable for use on gate valves. Novel structures and functional aspects of the invention disclosed herein provide increased efficiencies of manufacture and increased sealing capability for valves and strainers generally, and particularly for those used in refrigerant systems.

While three embodiments, and several modifications, of the present invention have been shown and described, it will be obvious to those skilled in the art that changes and modifications may be made without departing from the invention in its broader aspects. Therefore, the aim in the appended claims to cover all such changes and modifications as may fall within the true spirit and scope of the present invention.

The invention is claimed as follows:

1. In a housing adaptable for use in a globe valve or a check valve, said housing including an inlet passageway, an outlet passageway, and a central chamber portion positioned therebetween, said central chamber portion including a curved chamber dividing wall which bifurcates said housing into inlet and outlet portions, respectively, said curved dividing wall including a mediate portion having a generally circular aperture therethrough defining a zone for fluid flow between said inlet and said outlet portions, an annular flange extending from an outer wall of said central chamber portion in a direction coaxial and in spatial relation with said circular aperture through said dividing wall, and closure means engageable with said annular flange for sealing said flange against liquid flow outwardly therefrom, an improvement wherein said closure means include a
   cover which is sealingly engageable with said annular flange, said housing is adaptable for receiving a filter member therein for functioning as a strainer housing; and said filter element includes a generally cylindrical body having a foraminous side wall, an annular top portion which is adapted for being retained on said dividing wall generally circular aperture, and means adjacent at least one of the bottoms of said closing means for biasing said element upwardly with said top portion biased against said circular aperture.

2. The housing as defined in claim 1 wherein said filter element further includes an annular top opening and a closed bottom end including a plurality of double folded adjacent sidewall pleats, each joined along a double folded end and all joined together centrally of said end of said element to define radially extending pleats.

3. The housing as defined in claim 1 wherein said biasing means include a frusto-conical shape coil spring, and a permanent magnet retained interiorally of said coil spring for gathering foreign metallic particles and removing same from any liquid passing through said strainer.

4. The housing as defined in claim 1 wherein the opposed structural ends thereof are sized to accommodate inlet and outlet passageways therethrough which are the largest of a plurality of differing standard sizes, wherein said structural ends may also accommodate any of the smaller of said plurality of standard size passageways on differing ones of a single housing size.

5. In a valve assembly including a housing having an inlet passageway, an outlet passageway, and a central chamber portion positioned therebetween, said central chamber portion including a curved chamber dividing wall which bifurcates said housing into inlet and outlet portions, respectively, said curved dividing wall including a mediate portion thereof having a generally circular aperture therethrough defining a zone for fluid flow between said inlet and outlet portions, an annular flange extending from an outer wall of said central chamber portion in a direction co-axial and in spatial relation with said circular aperture through said dividing wall, a valve actuating member axially moveable with respect to said annular flange and said generally circular aperture, and a generally cylindrical valve disc retained on an inward end of said actuating member and including an annular recess extending radially inwardly adjacent an inner end of said disc for receiving and retaining an annular sealing seat member thereon, an improvement wherein said recess is generally rectangular in radial cross-section and includes a radially extending lip at a bottom end thereof for retaining said annular sealing seat once same is stretched thereover, and at least one of the remaining surfaces of said annular recess includes an annular discontinuity of a size sufficient to create a sealing engagement by deforming an adjacent surface of said annular sealing seat contiguous therewith.

6. In a valve assembly including a housing having an inlet passageway, an outlet passageway, and a central chamber portion positioned therebetween, said central chamber portion including a curved chamber dividing wall which bifurcates said housing into inlet and outlet portions, respectively, said curved dividing wall including a mediate portion thereof having a generally circular aperture therethrough defining a zone for fluid flow between said inlet and outlet portions, an annular flange extending from an outer wall defining said control chamber portion in a direction co-axial and in spatial relation with said circular aperture through said dividing wall, and a valve mounting assembly sealingly engaged on said annular flange, said assembly including a valve actuating member axially moveable with respect to said flange and said generally circular aperture, and a generally cylindrical valve disc retained on an inward end of said actuating member and including an annular recess extending radially inwardly adjacent an inner end of said disc for receiving and retaining an annular sealing seat member thereon, said valve actuating member is a valve stem having a generally cylindrical bottom end, said valve disc includes a valve stem receiving bore thereon of a diameter larger than a diameter of said stem bottom end for fitting therein, a first annular groove in said stem receiving bore and a second annular groove adjacent said bottom end, both positioned for the combined formation of a hollow annular passageway when said valve stem is positioned in said receiving bore, a plurality of spherical members sized to fit in said combined passageway and retain said stem in said bore, access bore means on said valve disc between an outside surface thereof and said combined passageway providing ingress and egress of said spherical members to said hollow annular passageway, and an improvement comprising an annular zone of shallow relief relative said second annular groove and positioned immediately inwardly therein adjacent on said valve stem for providing an area into which metal deformation of said valve stem may occur without forming an interference fit between said valve stem and said stem bore.

7. In a valve assembly including a valve housing, a valve stem mountable for reciprocating movement in a valve stem bore in said housing, and means for forming a sealing relation between said valve stem and said valve stem bore, said bore and said valve stem including complementary threaded surfaces along a portion of their lengths, said bore including an enlarged cylindrical area outwardly adjacent said threads, packing material positioned in at least a portion of said area, and a packing gland nut being threadedly received at the top of said cylindrical area for applying pressure on said packing material thereunder, and an improvement including a second cylindrical area of lesser diameter than said enlarged cylindrical area and positioned between said complementary threaded surfaces and said enlarged cylindrical area defining an annular land therebetween which is perpendicular to said valve stem, an annular sealing ring in said second cylindrical area for providing a sealing engagement beteween said stem and said bore, and a rigid annular washer mounted on said land for separationg said annular sealing ring from said packing material.

8. In a generally cylindrical valve disc adapted for use in a valve assembly, said valve disc including an annular recess extending radially inwardly adjacent a bottom of said disc for receiving and retaining an annular sealing seat member thereon, an improvement wherein said recess is generally rectangular in radial cross-section and includes a radially extending lip at a bottom end thereof for retaining said annular sealing seat once same is stretched thereover, and at least one of the remaining surfaces of said annular recess includes an annular discontinuity of a size sufficient to create a sealing engagement by deforming an adjacent surface of said annular sealing seat contiguous therewith.

9. The valve disc as defined in claim 8 further including a valve stem have a generally cylindrical bottom end; and wherein
said valve disc includes a valve stem receiving bore therein of a diameter larger than a diameter of said stem bottom end for fitting therein,
a first annular groove in said stem receiving bore and a second annular groove adjacent said bottom end both positioned for a combined formation of a hollow annular passageway when said valve stem is positioned in said bottom receiving bore,
a plurality of spherical members sized to fit in said combined passageway and retain said stem in said bore,
access bore means on said valve disc between an outside surface thereof and said combined passageway providing ingress and egress of said spherical members to said hollow annular passageway, and
an annular zone of shallow relief relative said second annular groove and positioned immediately thereadjacent on said valve seat for providing an area into which metal deformation of said valve stem may occur without forming an interference fit between said valve stem and said stem bore.

10. In a housing adaptable for use in a globe valve or a check valve, said housing including an inlet passageway, an outlet passageway, and a central chamber portion positioned therebetween, said central chamber portion including a curved chamber dividing wall which bifurcates said housing into inlet and outlet portions, respectively, said curved dividing wall including a mediate portion thereof having a generally bircular aperture therethrough defining a zone for fluid flow between said inlet and said outlet portions, an annular flange extending from an outer wall defining said central chamber portion in a direction co-axial and in spatial relation with said circular aperture through said dividing wall, said inlet and outlet passageways being threaded and including radially extending housing and faces extending from the outside end of said threads, and an iron pipe segment adapting said valve housing for mounting in a welded pipe system,
an improvement including an annular recess between said threaded portion and the remainder of said pipe segment, said recess including a continuous annular surface providing a continuous like-thickness joinder between said end face and said pipe annular surface for ease of welding same togetner to obtain an effective seal at any weld therearound.

* * * * *